United States Patent [19]
Sacripante et al.

[11] Patent Number: 5,866,290
[45] Date of Patent: *Feb. 2, 1999

[54] TONER AND DEVELOPER COMPOSITIONS

[75] Inventors: Guerino G. Sacripante, Oakville, Canada; Robert D. Bayley, Fairport, N.Y.; Carol A. Fox, Canandaigua, N.Y.; Thomas R. Hoffend, Webster, N.Y.; Bernard Grushkin, Pittsford, N.Y.

[73] Assignee: Xerox Corporation, Stamford, Conn.

[ * ] Notice: The term of this patent shall not extend beyond the expiration date of Pat. No. 5,368,970.

[21] Appl. No.: 905,040

[22] Filed: Aug. 1, 1997

Related U.S. Application Data

[63] Continuation-in-part of Ser. No. 369,630, Jan. 6, 1995, Pat. No. 5,698,422.

[51] Int. Cl.$^6$ .................................................... G03G 9/087
[52] U.S. Cl. ........................... 430/109; 430/110; 430/904
[58] Field of Search ..................................... 430/109, 110, 430/120, 124, 904

[56] References Cited

U.S. PATENT DOCUMENTS

| | | | |
|---|---|---|---|
| 3,590,000 | 6/1971 | Palermiti et al. | 252/62.1 |
| 3,681,106 | 8/1972 | Burns et al. | 117/17.5 |
| 4,525,445 | 6/1985 | De Roo et al. | 430/109 |
| 4,533,614 | 8/1985 | Fukumoto et al. | 430/99 |
| 4,833,057 | 5/1989 | Misawa et al. | 430/109 |
| 4,863,825 | 9/1989 | Yoshimoto et al. | 430/109 |
| 4,940,644 | 7/1990 | Matsubara et al. | 430/109 |
| 4,957,774 | 9/1990 | Doi et al. | 427/45.1 |
| 4,968,575 | 11/1990 | Matsumura et al. | 430/110 |
| 4,973,539 | 11/1990 | Sacripante et al. | 430/109 |
| 5,047,305 | 9/1991 | Uchida et al. | 430/110 |
| 5,324,612 | 6/1994 | Maeda et al. | 430/109 |
| 5,368,970 | 11/1994 | Grushkin | 430/110 |
| 5,391,452 | 2/1995 | Sacripante et al. | 430/106.6 |
| 5,466,554 | 11/1995 | Sacripante et al. | 430/110 |
| 5,565,292 | 10/1996 | Nakadera et al. | 430/109 |
| 5,578,409 | 11/1996 | Kotaki et al. | 430/109 |
| 5,698,422 | 12/1997 | Sacripante et al. | 430/109 |

FOREIGN PATENT DOCUMENTS

| | | |
|---|---|---|
| 0170421 A1 | 5/1986 | European Pat. Off. . |
| 0531146 A1 | 10/1993 | European Pat. Off. . |
| 0606873 A1 | 2/1994 | European Pat. Off. . |
| 1024827 | 1/1989 | Japan . |
| 2052362 | 2/1990 | Japan . |
| 2207438 | 2/1989 | United Kingdom . |

*Primary Examiner*—Bernard Codd
*Attorney, Agent, or Firm*—E. O. Palazzo

[57] ABSTRACT

A toner composition comprised of a polyester resin with hydrophobic end groups, colorant, optional wax, optional charge additive, and optional surface additives.

8 Claims, No Drawings

TONER AND DEVELOPER COMPOSITIONS

This application is a continuation-in-part of U.S. application Ser. No. 08/369,630, filed Jan. 6, 1995, U.S. Pat. No. 5,698,422 the disclosure of this application being totally incorporated herein by reference in its entirety.

BACKGROUND OF THE INVENTION

The present invention is generally directed to toner and developer compositions, and more specifically, the present invention is directed to developer comprised of a carrier, optionally a flow aid, and a hydrophobic toner compositions containing polyester resins wherein the end groups of the polyester resin are predominately modified with hydrophobic moieties, which, for example, impart or assist in imparting excellent low relative humidity sensitivity to the toner particles and enable toners with rapid admix characteristics. In embodiments, there are provided in accordance with the present invention toner compositions comprised of pigment particles, optionally a charge control agent, and resin particles comprised of a polyester resin containing a hydrophobic end group with, for example, from 6 to about 24 carbon atoms, such as hexyl, lauryl, stearyl, cetyl, and the like, or an aryl such as or benzyl, and the like. More specifically, in embodiments of the present invention, there are provided a toner comprised of colorant, especially pigment particles, optionally a charge enhancing agent, optionally a wax component, and a polyester resin containing hydrophobic end groups, and which polyester is illustrated by the formulas I through III

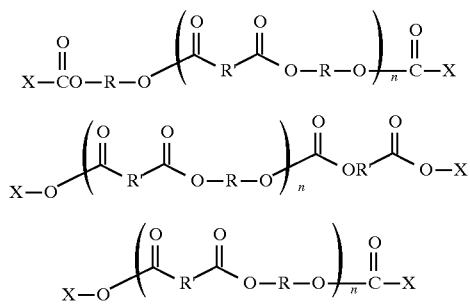

wherein R is an alkylene group such as divalent ethylene, propylene, butylene, ethyleneoxyethylene or a hydrocarbon with from about 2 to about 24 carbon atoms, from about 2 to about 22, and preferably 2 to about 20 carbon atoms, and more specifically, with 1, 2, 3, 4, 5, 6, 7, 8, 9, 10, 11, 12, 13, 14, 15, 16, 17, 18, 19, 20, 21, or 22 carbon atoms, a cyclohexylene or 1,4-dimethyl cyclohexylene group; R' is an arylene group with from about 6 to about 14 carbon atoms such as the divalent moieties phenylene, isophthalylene, terephthalylene or phthalylene, an olefinic group such as vinylene, methylvinylene, or an alkylene group such as ethylene, propylene, butylene, pentylene, hexylene, and the like; X is an alkyl or aryl group, such as hexyl, heptyl, octyl, lauryl, stearyl, or benzyl, with from about 4 to about 24 carbon atoms; and n represents the number of segments, such as from about 10 to about 300. The polyester resin can be branched or crosslinked by employing trifunctional or multifunctional reagents, such as trimethylolpropane or pyromellitic acid, of from about 0.1 to about 6 mole percent based on the starting diacid or diester selected to prepare the polyester resin, and can be represented in the above formulas I through III by incorporating the branching segments, p, q, r or s as illustrated by the formulas

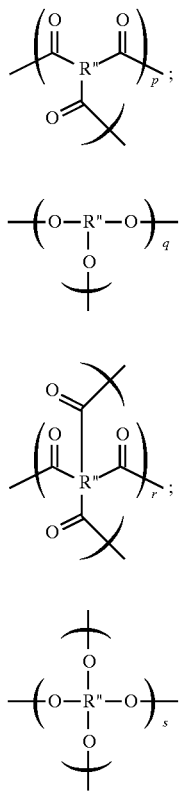

wherein R" is a multivalent aromatic or aliphatic radical with from about 3 to about 20 carbon atoms, such as the tri or tetravalent derivatives of propane, butane, pentane, hexane, cyclohexane, heptane, octane, benzene, naphthalene, anthracene, and the like; and p, q, r and s represent the branching segment and in embodiments is from about 0.1 to about 6 mole percent based on the starting diacid or diester used to make the resin and provided that the sum of segments n, p and q is 100 mole percent of the polyester resin.

In embodiments, the present invention relates to the preparation of a polyester resin, and wherein the hydroxyl and acid end groups of the resulting polyester are minimized, and preferably avoided. Polyester resins are known to contain acid and hydroxyl groups of from about 20 to about 1,000 milliequivalents per gram of polyester, usually present as end groups. It is believed that these hydrophilic end groups cause the toner composites to have tribocharging performance that is humidity sensitive. The ratio of the triboelectric charge of the toner composites at low humidity to that at high humidity is of from about 2.8 to about 4.5, and usually from about 3.0 to about 3.5. To reduce the relative humidity sensitivity of polyester based toners, the present invention minimizes the hydrophilic end groups, such as hydroxyl or acid moieties on the polyester resin, by capping the ends of the polyester with hydrophobic groups, such as alkyl moieties, hence resulting in toners with low humidity sensitivity such as from about 1.0 to about 2.8 and preferably from about 1.0 to about 2.5. A further embodiment of the present invention relates to the preparation of a polyester resin with monofunctional monomers that cap the ends of the polyester resin to result in the aforementioned polyester resin with hydrophobic end groups, and wherein the concentration of the monofunctional hydrophobic monomers is from about 0.1 mole percent to about 4.0 mole percent based on the starting diacid or diester used to make the resin, and thereby controls the weight average molecular weight of from about 4,000 grams per mole to about 250,000 grams per mole, especially when monofunctional monomers with a carbon chain length of from about 4 to about 24 are selected or wherein the use of bulkier monomers such as 1,2-naphthalene ethanol, or phenylmethanol are utilized.

The aforementioned toner composition and developer thereof, that is toner mixed with a carrier, display a low relative humidity sensitivity for the toners thereof, which is desired such that the triboelectric charge is stable to changes in environmental humidity conditions. Copiers and printers equipped with two component developers, that is a toner as one component mixed with the carrier as the other component, can exhibit a positive or negative triboelectric charge with a magnitude of from about 5 microcoulombs per gram to about 40 microcoulombs per grams. This triboelectric charge permits the toner particles to be transferred to the latent image of the photoreceptor with an opposite charge, thereby forming a toned image on the photoreceptor, which is subsequently transferred to a paper or a transparency substrate, and thereafter subjected to fusing or fixing processes. In these development systems, it is important for the triboelectric charge to be stable under differing environmental humidity conditions such that the triboelectric charge does not change by more than from about 5 to about 10 microcoulombs per gram. A change of more than from about 5 microcoulombs per gram to about 10 microcoulombs per gram in triboelectric charge of the toner developer can cause nonuniform toned images or result in no toning of the photoreceptor, thus unbalanced density or gray scale is observed in the developed images, or no developed images at all result. Generally, humidity ranges may differ from less than about 20 percent in dry regions to more than about 80 percent in humid regions, and some geographical regions may exhibit fluctuations of up to from about 50 to about 80 percent humidity level within the same day. In such climates, it is important that the developmental triboelectric charge does not change by more than from about 5 microcoulombs per gram to about 10 microcoulombs per gram. As toner resins generally represent from about 80 percent to about 98 percent by weight of toner, the resin sensitivity to moisture or humidity conditions should be minimized thereby not adversely affecting the triboelectric charge thereof.

A number of toner polymeric resins utilized as toner compositions, such as for example styrene-acrylates, styrene-methacrylates, styrene-butadienes and especially polyesters, contain from about 0.1 to about 2 percent by weight of moisture, and in some instances, the moisture content of polyesters may change from about 0.1 to about 4 percent by weight at humidity levels ranging from about 10 to about 100 percent, or more usually from about 20 percent to about 80 percent humidity. These changes in moisture content of the resin may have a dramatic adverse effect on the triboelectric charge of the toner and developer thereof. Relative humidity sensitivity of toner is customarily measured by first fabricating a toner comprised of a pigment, optional charge control agent and a resin, then admixing the toner from about 3 percent by weight to about 7 percent by weight with a carrier. The developer composition is then equilibrated to various humidity levels in a sealed chamber at controlled temperatures of 60° F. at 20 percent RH and 80° C. at 80° F. for a period of about 48 hours. The triboelectric charge is then measured for the same developer composition at different humidity levels and the results analyzed by several methods, such as graphing the triboelectric charge as a function of humidity level and observing the regions in which dramatic changes occur. Another measuring method comprises dividing the aforementioned graphical interpolation of tribo versus humidity level in three regions, wherein region A is from about 0 to about 30 percent humidity, region B is from about 30 to about 65 percent humidity, and region C is higher than about 65 percent humidity to about 100 percent. Since these measurements are cumbersome and time consuming, there can be measured the triboelectric charge after subjecting the toner developer composition to two humidity levels, such as 20 percent relative humidity and 80 percent relative humidity, and then calculating the relative sensitivity by taking the triboelectric charge ratio of the 20 to 80 percent relative humidity as follows Equation 1

$$\text{Relative Humidity Sensitivity} = \frac{\text{Triboelectric Charge at 20\% } RH \text{ at 60° F.}}{\text{Triboelectric Charge at 80\% } RH \text{ at 80° F.}}$$

wherein RH is the relative humidity.

Thus, if the relative humidity sensitivity is about 1.0, the toner composition is considered humidity insensitive, whereas if the humidity sensitivity is greater than about 3, the toner composition is considered to be very humidity sensitive. It is generally believed that toners prepared with a number of polymeric materials exhibit relative sensitivity greater than 1.0, and in general, styrene butadiene, or styrene acrylate based toners possess humidity sensitivities greater than 1.0 and less than about 2.5, whereas generally, polyester based toners possess a relative humidity sensitivity of greater than 2.5 and less than about 5. Hence, an advantage of the styrene-acrylate or styrene-butadiene type binder resins for toners over that of polyesters is their lower relative humidity sensitivity. Polyesters are known to display advantages over styrene based resins, such as low fixing temperatures of from about 120° C. to about 140° C., and nonvinyl offset properties. Therefore, there is a need for toner compositions comprised of a resin which possess many of the aforementioned advantages, such as low fixing temperature of from about 120° C. to about 140° C., nonvinyl offset properties, and in addition low sensitivity of tribocharging as a function of relative humidity such that the ratio of triboelectric charge at 20 percent and 80 percent RH is from about 1.0 to about 2.5. These and other advantages are attained in embodiments with the toner compositions of the present invention comprised of a pigment, optionally a charge control agent, and a modified polyester resin wherein the end groups are hydrophobic moieties, and which toner exhibits a low fixing temperature of from about 120° C. to about 140° C., nonvinyl offset properties, and low relative humidity sensitivity, such as from about 1.0 to about 2.5.

Additionally, the aforementioned toner compositions of the present invention may contain waxes so that fuser stripping failure is avoided or minimized. The present invention in embodiments is directed to polyesters with hydrophobic end groups, wherein specifically the hydrophobic end groups are from about 4 carbon atoms to about 24 carbon atoms, or from 4 to about 22 carbon atoms.

Furthermore, the presence of the hydrophobic end group monomers provide an improved process for obtaining the aforementioned polyesters. Specifically, the concentration of the monofunctional monomer provides molecular weight control of the polyester product, and its reproducibility. The process for the preparation of the polyester resins of the present invention is known as a condensation process or step polymerization. The condensation process involves the addition of bifunctional monomers which result in dimers, followed by the reaction of dimers with dimers to form tetramers, or dimers with monomers to form trimers. The reaction sequence then continues in that these dimers, trimers and tetramers react with each other to form multiples thereof and known in the art to be oligomers, which in turn react with other oligomers to form the polyester. In this aforementioned kinetic scheme, the degree of polymerization is achieved by terminating the reaction at the desired point, hence it is time dependent. It is known that obtaining a specific degree of polymerization by relying on the time of the polymerization of the step reaction polymerization process is very difficult. A method for controlling the degree of polymerization is to adjust the composition of the reaction mixture away from stoichiometric equivalence, by adding a nonvolatile monofunctional reagent in the amount from about 0.1 mole percent to about 4.0 mole percent based on the starting diacid or diester used to make the resin. In the present invention, the monofunctional monomers employed are the hydrophobic monomers. The degree of polymerization can further be controlled by the amount of monofunctional monomer utilized, hence limiting the degree of polymerization as determined by its concentration such that the total amount of end groups is proportional to the amount of monofunctional monomer employed. This aids in the reproducibility of the product by adjusting the amount of monofunctional monomer to the desired limit of degree of polymerization, hence avoiding total dependence on time of polymerization.

Also, the aforementioned toner compositions usually contain colorants, such as pigment particles comprised of, for example, carbon black like REGAL 330®, magnetites, or mixtures thereof, cyan, magenta, yellow, blue, green, red, or brown components, or mixtures thereof thereby providing for the development and generation of black and/or colored images. The toner compositions of the present invention in embodiments thereof possess excellent admix characteristics as indicated herein, and maintain their triboelectric charging characteristics for an extended number of imaging cycles, up to for example 1,000,000 in a number of embodiments. Colorants include pigments, dyes, mixtures thereof, mixtures of pigments, mixtures of dyes, and the like. The toner and developer compositions of the present invention can be selected for electrophotographic, especially xerographic, imaging and printing processes, including color processes.

There is also a need for toners having low relative humidity sensitivity, such as from about 1.0 to about 2.8 and preferably of from about 1.0 to about 2.5 as calculated by Equation 1, and wherein low minimum fixing temperatures are obtained, such as from about 120° C. to about 140° C. with broad fusing latitude such as from about 30° C. to about 45° C. wherein the fusing latitude is considered the difference between the minimum fixing temperature and the temperature at which the toner offsets to the fusing member.

PRIOR ART

Certain polyester toner resins are known, reference for example U.S. Pat. Nos. 3,590,000 and 4,525,445, which illustrate a linear polyester comprised preferably of propoxylated bisphenol A and fumaric acid, and available as SPAR II® from a number of sources such as Atlas Chemical Company. There is also disclosed in Japanese Laid Open Patents 44836 (1975), 37353 (1982), 109875 (1982) and 3031858-A (1991), and references therein a linear polyester resin comprised of polybasic carboxylic acid, such as derived from ethoxylated bisphenol A, cyclohexanedimethanol and terephthalic acid. Further, there is disclosed in U.S. Pat. No. 4,533,614, and more specifically, U.S. Pat. Nos. 4,957,774 and 4,533,614 a linear polyester resin comprised of dodecylsuccinic anhydride, terephthalic acid, alkyloxylated bisphenol A and trimellitic anhydride as chain extenders.

Additionally, there is disclosed in U.S. Pat. No. 4,940,644, U.S. Pat. No. 5,047,305, U.S. Pat. No. 4,049,447, and Canadian Patent 1,032,804 a linear polyester comprised of an amorphous aromatic polyester derived from an arylene radical and diol, and specifically resins such as poly (neopentyl-terephthalate) comprised of terephthalate radical and neopentyl glycol. Also, there is disclosed in U.S. Pat. No. 4,525,445 a toner composition comprised of a linear polyester derived from fumaric acid, isophthalic acid and propoxylated bisphenol. Further, other toner compositions are known to contain linear polyester resins, such as those disclosed in U.S. Pat. No. 4,968,575 a linear polyester blocked with rosin compound; U.S. Pat. No. 5,004,664 a linear polyester prepared from the ring opening polymerization of cyclic monomers; U.S. Pat. No. 5,057,392 a blend of resins comprised of a crystalline and amorphous polyesters; and U.S. Pat. Nos. 4,543,313 and 4,891,293 wherein there are disclosed linear thermotropic liquid crystalline polyester resins, the disclosures of which are totally incorporated herein by reference. Other U.S. Patents of interest disclosing, for example, linear polyesters are U.S. Pat. Nos. 4,052,325; 3,998,747; 3,909,482; 4,4049,447; 4,288,516; 4,140,644; 4,489,150; 4,478,423; 4,451,837; 4,446,302; 4,416,965; 4,866,158; 5,153,301; 5,116,713; 5,043,242; 5,045,424; 5,049;646; 5,102,762; 5,110,977 and 4,837,394.

Compositions containing modified polyester resins with a polybasic carboxylic acid are also known and disclosed in Japanese Laid Open Nos. 44836 (1975); 3753 (1982) and 109875 (1982); and also in U.S. Pat. No. 3,681,106, and more specifically branched or crosslinked polyesters derived from polyvalent acids or alcohols are illustrated in U.S. Pat. Nos. 4,298,672; 4,863,825; 4,863,824; 4,845,006; 4,814,249; 4,693,952; 4,657,837; 5,143,809; 5,057,596; 4,988,794; 4,981,939; 4,980,448; 4,960,664; 4,933,252; 4,931,370; 4,917,983 and 4,973,539. The resulting modified polyester resins by branching or crosslinking improves the hot-offset resistance only at the expense of the low fixing temperature performance. In some of the aforementioned prior art references, there are disclosed polyester resins wherein the end groups are either an acid group, wherein acid numbers are reported, or hydroxyl groups. Therefore, the polyester ends are hydrophilic and different from those of the present invention wherein the polyester resins are modified to be comprised mainly of hydrophobic end groups such that hydroxyl, or acid content is minimized or avoided, and not present, at least to a significant amount. The polyester resin with hydrophobic end groups of the present invention reduces the relative humidity sensitivity of the toners made from the resins, while still retaining the favorable low fixing temperatures, such as from about 120° C. to about 140° C. and broad fusing latitude, as well as excellent admix such as about 60 seconds or less.

To prevent fuser roll offsetting and to increase the fuser latitude of toners, various modifications to toner compositions have been proposed. For example, U.S. Pat. No. 4,513,074 discloses adding waxes, such as low molecular weight polyethylene, polypropylene, to toners to increase their release properties. To sufficiently prevent offset, however, considerable amounts of such materials may be required, resulting in the detrimental effect of toner agglomeration, degradation in free flow properties, and destabilization of charging properties.

There is illustrated in U.S. Pat. No. 5,168,028 a negatively chargeable toner for developing latent electrostatic images comprising a binder resin, a coloring agent and a charge controlling agent which comprises a fluorine-containing quaternary ammonium salt. There are illustrated in U.S. Pat. No. 5,324,613 toners with hydroxy bis(3,5-ditertiary butyl salicylic) aluminate monohydrate; U.S. Pat. No. 4,656,112 toners with a zinc complex (E-84) of 3,5-ditertiary butyl salicylate; and U.S. Pat. No. 4,845,003 toners with a hydroxy carboxylic acid. The disclosures of each of the aforementioned patents are totally incorporated herein by reference.

PENDING APPLICATIONS

There is illustrated in copending application U.S. Ser. No. 251,430, now U.S. Pat. No. 5,466,554, the disclosure of which is totally incorporated herein by reference, a toner comprised of colorant, such as pigment particles, optionally a charge control agent, and a polyester resin with hydrophobic end groups such as a silane or fluorinated carbon, halogenated carbon and the like.

There is illustrated in copending application U.S. Ser. No. 100,842, now U.S. Pat. No. 5,391,452, the disclosure of which is totally incorporated herein by reference, a toner comprised of colorant, such as pigment particles, optionally a charge control agent and a polyester resin comprised of poly(1,2-propylene diethylene terephthalate) with hydroxyl end groups.

SUMMARY OF THE INVENTION

It is an object of the present invention to provide toner and developer compositions wherein the polyester toner binder resin contains hydrophobic end groups.

In another object of the present invention there are provided negatively, or positively charged toner compositions useful for the development of electrostatic latent images including color images.

In yet another object of the present invention there are provided negatively charged toner or positively charged toner compositions containing polyester with hydrophobic end groups such as a hydrocarbon or aromatic moiety of from about 4 carbon atoms to about 24 carbon atoms. Also, in another object of the present invention there are provided developer compositions with negatively, or positively charged toner particles, and carrier particles.

In yet a further object of the present invention there are provided toners having triboelectric properties with low humidity sensitivity such as, for example, from about 1.0 to about 2.5.

Also, in yet another objective of the present invention there are provided toners having triboelectric properties with low humidity sensitivity, such as for example, from about 1.0 to about 2.5, with desirable admix properties of 15 seconds to 60 seconds as determined by the charge spectrograph, and preferably 15 to 30 seconds.

Moreover, in another objective of the present invention there are provided toners having triboelectric properties with low humidity sensitivity with low minimum fixing temperatures such as from about 120° C. to about 140° C.

Also, in yet another objective of the present invention there are provided toners having triboelectric properties with low humidity sensitivity with broad fusing latitude, such as from about 30° C. to about 45° C.

Also, in yet another objective of the present invention there is provided a method for reproducibly controlling the degree of polymerization.

Furthermore, in yet another object of the present invention there are provided toner and developer compositions that are useful in a variety of electrostatic imaging and printing processes, including color xerography, and wherein the admix charging times are less than or equal to about 60 seconds.

These and other objects of the present invention can be accomplished in embodiments thereof by providing toner compositions comprised of colorant, such as pigment particles, and a polyester resin wherein the end groups are hydrophobic. More specifically, the present invention in embodiments is directed to toner compositions comprised of pigment or dye, and a polyester having chemically attached thereto end groups, such as an alkyl moiety comprised of a hydrocarbon, especially alkyl, of from about 4 carbon atoms to about 24 carbon atoms. Advantages of low humidity sensitivity, rapid admix, appropriate triboelectric characteristics, and the like are achieved with many of the aforementioned toners of the present invention.

Examples of polyester resins with hydrophobic end groups that can be selected include the polyesters with alkyl end groups of the formulas illustrated herein such as poly (1,2-propylene terephthalate-co-diethylene terephthalate) end blocked with stearate, poly(1,2-propylene terephthalate) end blocked with stearate, poly(1,2-propylene terephthalate-co diethylene terephthalate) end blocked with laurate, poly (1,2-propylene terephthalate-co-diethylene terephthalate) end blocked with cetate, poly(1,2-propylene terephthalate-co-diethylene terephthalate) end blocked with octoate, poly (1,2-propylene terephthalate-co-diethylene terephthalate) end blocked with a hexyl group, poly(1,2-propylene terephthalate-co-diethylene terephthalate) end blocked with a dodecyl group, poly(1,2-propylene terephthalate-co-diethylene terephthalate) end blocked with a decyl group, poly(1,2-propylene terephthalate-co-diethylene terephthalate) end blocked with a benzyl group, mixtures thereof, and the like; and which display a number average molecular weight of from about 2,000 grams per mole to about 100,000 grams per mole, a weight average molecular weight of from about 4,000 grams per mole to about 250,000 grams per mole, and polydispersity of from about 1.8 to about 17, as measured by gel permeation chromatography.

The polyester resin with the hydrophobic end groups selected for the toner and developer compositions of the present invention, such as the poly(1,2-propylene terephthalate-co-diethylene terephthalate) end blocked with stearate, can be prepared by charging a 1 liter Parr reactor equipped with a mechanical stirrer and side condenser, a mixture of from about 0.9 to about 0.95 mole of diester, such as dimethylterephthalate, from about 1.75 moles to about 1.85 moles of a diol, such as 1,2-propanediol or diethylene glycol or a mixture of the diols, containing from about 0.15 to about 0.3 mole of diethylene glycol, from about 0.01 to about 0.1 mole percent of stearic acid, and from about 0.001 mole to about 0.05 of a condensation catalyst such as butyltin oxide. The reactor is subsequently heated to 170° C. for a duration of from about 360 minutes to about 720 minutes with stirring at from about 10 revolutions per minute to about 200 revolutions per minute. During this time, from about 1.7 moles to about 1.9 moles of methanol byproduct can be collected through the condenser. The reactor temperature is then raised to about 220° C. and the pressure is reduced to about 1 torr over a period of from about 2 hours to about 3 hours. The polymeric resin comprised of poly(1,2-propylene terephthalate-co-diethylene terephthalate) end blocked with stearate is then discharged through the bottom of the reactor and cooled to room temperature.

In a specific embodiment, a polyester resin comprised of poly(1,2-propylene terephthalate-co-diethylene terephthalate) end blocked with stearate can be obtained by charging a one liter Parr reactor equipped with a bottom drain valve, double turbine agitator and distillation receiver with a cold water condenser with from about 0.95 mole to about 1.05 mole of diester, such as dimethylterephthalate, from about 0.60 to about 2.05 moles of diol such as 1,2-propanediol, from about 0.01 to about 0.40 mole of a second diol such as diethylene glycol, from about 0.001 to about 0.04 mole of monofunctional monomer such as stearic acid, and from about 0.001 to about 0.05 mole of a catalyst such as tetrabutyl titanate. The reactor is then heated to from about 150° C. to about 187° C. with stirring for a duration of from about 3 hours to about 20 hours. Five tenths (0.5) to about 1 mole of alcohol byproduct is collected in the distillation receiver comprised of from about 80 percent to about 100 percent by volume of methanol and from about 0 percent to about 20 percent by volume of 1,2-propanediol as measured by an ABBE refractometer available from American Optical Corporation. The mixture is then heated from about 180° C. to about 220° C. and vacuum applied slowly. While raising the reaction temperature from 180° C. to 220° C., the pressure is reduced from atmospheric pressure (760 torr) to about 0.01 torr. This stepwise increase in temperature and reduction in pressure takes place over the course of from about 1 to about 9 hours while collecting distillate. Approximately 0.8 to about 1.5 mole of distillate are collected in the distillation receiver comprised of a mixture of methanol and glycol. The reactor is then purged with nitrogen to atmospheric pressure. The resulting linear polyester resin is then discharged through the bottom drain onto a container cooled with dry ice to yield poly(1,2-propylene terephthalate-co-diethylene terephthalate) end blocked with stearate. Variations of the above synthesis can be used by those skilled in the art, such as introducing the monofunctional monomer after the initial esterification.

Toners prepared with the polyester resins of the present invention can be obtained by admixing and heating the polyester resin particles such as poly(1,2-propylene terephthalate-co-diethylene terephthalate) end blocked with stearate, pigment particles such as magnetite, carbon black, or mixtures thereof, and preferably from about 0.20 percent to about 5 percent of optional charge enhancing additives, or mixtures of charge additives, and optionally wax in a melt mixing device, such as the ZSK53 extruder available from Werner Pfleiderer. After cooling, the toner composition is subjected to grinding utilizing, for example, a Sturtevant micronizer for the purpose of achieving toner particles with a volume median diameter of less than about 25 microns, and preferably from about 6 to about 12 microns, as determined by a Coulter Counter. The toner particles can be classified by utilizing, for example, a Donaldson Model B classifier for the purpose of removing fines, that is toner particles less than about 4 microns volume median diameter.

Specific examples of diols utilized in preparing the aforementioned polyesters of the present invention include diols or glycols such as ethylene glycol, 1,2-propylene glycol, 1,3-propylene glycol, 1,2-butylene glycol, 1,3-butylene glycol, 1,4-butylene glycol, 1,2-pentylene glycol, 1,3-pentylene glycol, 1,4-pentylene glycol, 1,5-pentylene glycol, 1,2-hexylene glycol, 1,3-hexylene glycol, 1,4-hexylene glycol, 1,5-hexylene glycol, 1,6-hexylene glycol, heptylene glycols, octylene glycols, decylene glycol, dodecylene glycol, 2,2-dimethyl propanediol, propoxylated bisphenol A, ethoxylated bisphenol A, 1,4-cyclohexane diol, 1,3-cyclohexane diol, 1,2-cyclohexane diol, 1,2-cyclohexane dimethanol, mixtures thereof, and the like; and these glycols are employed in various effective amounts of, for example, from about 45 to about 55 mole percent of the polyester product resin.

Specific examples of diacids or diesters utilized in preparing the aforementioned polyesters include malonic acid, succinic acid, 2-methylsuccinic acid, 2,3-dimethylsuccinic acid, dodecylsuccinic acid, glutaric acid, adipic acid, 2-methyladipic acid, pimelic acid, azelaic acid, sebacic acid, terephthalic acid, isophthalic acid, phthalic acid, 1,2-cyclohexanedioic acid, 1,3-cyclohexanedioic acid, 1,4-cyclohexanedioic acid, glutaric anhydride, succinic anhydride, dodecylsuccinic anhydride, maleic anhydride, fumaric acid, maleic acid, itaconic acid, 2-methyl itaconic acid, and dialkyl esters of these diacids and dianhydrides, wherein the alkyl groups of the dialkyl ester are of one carbon atom to about 5 carbon atoms and mixtures thereof, and the like, and which component is employed, for example, in amounts of from about 45 to about 55 mole percent of the resin.

Specific examples of polycondensation catalysts can include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts are selected in effective amounts of from about 0.01 mole percent to about 5 mole percent based on the starting diacid or diester used to make the resin.

Examples of monofunctional hydrophobic monomers which can be utilized in preparing the aforementioned polyesters include monofunctional alcohols such as hexanol, heptanol, octanol, nonanol, decanol, undecanol, dodecanol, tridecanol, tetradecanol, pentadecanol, hexadecanol, heptadecanol, octadecanol, and other alcohols, such as derived from about 6 to about 24 carbon atoms, oleyl alcohol, linoleyl alcohol, cinnamyl alcohol, alkyl substituted alcohols, such as 2-methylhexanol, 2,3,3-trimethylhexanol, 2-methyloctanol, 3,7-dimethyl-1,6-octadien-3-ol and the like, hydrophobic aromatic monomers such as benzyl alcohol, monofunctional acids such as hexanoic acid, heptanoic acid, octanoic acid, nonanoic acid, decanoic acid, stearic acid, lauric acid, palmitic acid, oleic acid, linoleic acid, cinnamic acid, and other alkyl acids, such as derived from about 4 to about 24 carbon atoms, benzoic acid, naphthoic acid, mixtures thereof, and the like; and which components can be employed in effective amounts of from about 0.1 mole percent to about 4.0 mole percent based on the starting diacid or diester used to make the resin.

Additionally, crosslinking or branching agents can be utilized, such as trifunctional or multifunctional monomers, which increase the molecular weight and polydispersity of the polyester, and are selected from the group consisting of glycerol, trimethylol ethane, trimethylol propane, pentaerythritol, sorbitol, diglycerol, trimellitic acid, trimellitic anhydride, pyromellitic acid, pyromellitic anhydride, 1,2,4-cyclohexanetricarboxylic acid, 2,5,7-naphthalenetricarboxylic acid, 1,2,4-butanetricarboxylic acid, mixtures thereof, and the like; and which components can be employed in effective amounts of from about 0.1 mole percent to about 6.0 mole percent based on the starting diacid or diester used to make the resin.

Numerous well known suitable colorants, such as pigments or dyes can be selected as the colorant for the toner particles including, for example, carbon black like REGAL 330®, nigrosine dye, aniline blue, phthalocyanines, magnetite, or mixtures thereof. A number of carbon blacks available from, for example, Cabot Corporation can be selected. The pigment, which is preferably carbon black, should be present in a sufficient amount to render the toner composition highly colored. Generally, the colornat, such as the pigment particles are present in amounts of from about 1 percent by weight to about 20 percent by weight, and preferably from about 2 to about 10 weight percent based on the total weight of the toner composition. Colorant includes dyes, pigments, mixtures thereof, mixtures of pigments, mixtures of dyes, and other suitable colorants that will impart a desired color to the toner.

When the pigment particles are comprised of magnetites, thereby enabling single component magnetic toners in some instances, which magnetites are a mixture of iron oxides ($FeO.Fe_2O_3$) including those commercially available as MAPICO BLACK®, they are present in the toner composition in an amount of from about 10 percent by weight to about 80 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

Charge additive examples include those as illustrated in U.S. Pat. No. 4,338,390, the disclosure of which is totally incorporated herein by reference, which additives can impart a positive charge to the toner composition; the alkyl pyridinium compounds as disclosed in U.S. Pat. No. 4,298,672, the disclosure of which is totally incorporated herein by reference, and the charge control additives as illustrated in U.S. Pat. Nos. 3,944,493; 4,007,293; 4,079,014; 4,394,430, and 4,560,635, which illustrates a toner with a distearyl dimethyl ammonium methyl sulfate charge additive. Negative charge additives can also be selected, such as zinc or aluminum complexes, like an aluminum compound of a hydroxy carboxylic acid (BONTRON E-88® from Orient Chemical Company), the zinc complex of 3,5-ditertiary butyl salicylate (BONTRON E-84® from Orient Chemical Company) and hydroxy bis (3,5-ditertiary butyl salicylic) aluminate monohydrate (Alohas) and the like.

There can be included in the toner compositions of the present invention low molecular weight waxes, or mixtures thereof, such as polypropylenes and polyethylenes such as EPOLENE N-15™ commercially available from Eastman Chemical Products, Inc., VISCOL 550-P™, a low weight average molecular weight polypropylene available from Sanyo Kasei K.K., and similar materials. The commercially available polyethylenes selected have a molecular weight of from about 1,000 to about 3000, such as those obtainable from Petrolite Corporation, while the commercially available polypropylenes utilized for the toner compositions of the present invention are believed to have a molecular weight of from about 4,000 to about 5,000. Many of the polyethylene and polypropylene compositions useful in the present invention are illustrated in British Patent No. 1,442, 835, the disclosure of which is totally incorporated herein by reference. The low molecular weight wax materials are present in the toner composition of the present invention in various amounts, however, generally these waxes are present in the toner composition in an amount of from about 1 percent by weight to about 15 percent by weight, and preferably in an amount of from about 2 percent by weight to about 10 percent by weight.

There can also be blended with the toner compositions of the present invention other toner additives, such as external additive particles including flow aid additives, which additives are usually present on the surface thereof. Examples of these additives include metal oxides, such as aluminum oxide, titanium oxide, tin oxide, cerium oxide mixtures thereof, and the like, colloidal fumed silicas, such as AEROSIL®, or Cabosil®, metal salts and metal salts of fatty acids including zinc stearate, magnesium stearate, polymeric particles of from 0.2 to 5 microns such as polyvinylidene fluoride which is obtainable from ATOCHEM North America, Inc, polytetrafluoroethylene that is available from ICI Advanced Materials, or polymeric microspheres of from 0.1 to 2.0 microns, such as those obtainable from Nippon Paint, Osaka, Japan, and mixtures thereof, which additives are generally present in an amount of from about 0.1 percent by weight to about 5 percent by weight, and preferably in an amount of from about 0.1 percent by weight to about 3 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL®, can be surface treated with known charge additives, such as DDAMS, in an amount of from about 1 to about 30 weight percent and preferably 10 weight percent, followed by the addition thereof to the toner in an amount of from 0.1 to 10, and preferably 0.1 to 1 weight percent.

Encompassed within the scope of the present invention are colored toner and developer compositions comprised of toner resin particles illustrated herein, and optional carrier particles, and as colorants red, blue, green, brown, magenta, cyan and/or yellow particles, as well as mixtures thereof. More specifically, with regard to the generation of color images utilizing a developer composition with the charge enhancing additives of the present invention, illustrative examples of magenta materials that may be selected as pigments include, for example, 2,9-dimethyl-substituted quinacridone identified in the Color Index as Cl 73915, Pigment Red 122, anthraquinone dye identified in the Color Index as Cl 60710, Cl Dispersed Red 15, diazo dye identified in the Color Index as Cl 26050, Cl Solvent Red 19, and the like. Illustrative examples of cyan materials that may be used as pigments include copper tetra-4-(octadecyl sulfonamido) phthalocyanine, beta- copper phthalocyanine pigment listed in the Color Index as Cl 74160 Pigment Blue 15.3 and Anthrathrene Blue, identified in the Color Index as Cl 69810, Special Blue X-2137, and the like; while illustrative examples of yellow pigments that may be selected are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles of the present invention are selected to be of a negative or positive polarity enabling the toner particles, which are oppositely charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. Nos. 3,526,533 and 3,467,634, the disclosures of which are totally incorporated herein by reference; polymethyl methacrylates; other known coatings; and the like. The carrier particles may also include in the coating, which coating can be present in one embodiment in an amount of from about 0.1 to about 3 weight percent, conductive substances, such as carbon black, in an amount of from about 5 to about 30 percent by weight. Polymer coatings not in close proximity in the triboelectric series can also be selected, reference U.S. Pat. Nos. 4,937,166 and 4,935,326, the disclosures of which are totally incorporated herein by reference, including, for example, KYNAR® and polymethylmethacrylate mixtures like 40/60. Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 35 microns to about 1,000 and preferably from about 50 to about 200 microns in diameter, thereby permitting them to, for example, possess sufficient density and inertia to avoid adherence to the electrostatic images during the development process. The carrier component can be mixed with the toner composition in various suitable combinations, such as from about 1 to 5 parts per toner to about 100 parts to about 200 parts by weight of carrier, are selected.

The toner and developer compositions of the present invention may be selected for use in electrostatographic imaging apparatuses containing therein conventional photoreceptors providing that they are capable of being charged negatively. Thus, the toner and developer compositions of the present invention can be used with layered photoreceptors that are capable of being charged negatively, or positively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys. Other similar photoreceptors can be selected providing the objectives of the present invention are achievable.

The toner compositions are usually jetted and classified subsequent to preparation to enable toner particles with a preferred average diameter of from about 5 to about 25 microns, and more preferably from about 6 to about 12 microns. Also, the toner compositions of the present invention preferably possess a triboelectric charge of from about 5 to 40 microcoulombs per gram in embodiments thereof as determined by the known charge spectograph. Admix time for the toners of the present invention are preferably from about 15 seconds to 1 minute, and more specifically, from about 15 to about 30 seconds in embodiments thereof as determined by the known charge spectograph. These toner compositions with rapid admix characteristics enable, for example, the development of latent electrostatographic images in electrophotographic imaging apparatuses, which developed images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Weight percent in embodiments refers to the total amount of components, especially solids, divided into the specific component and multiplied by 100. For example the weight percent of colorant, such as pigment can be calculated by subtracting the amount of pigment from the amount of pigment and resin and dividing the result by the amount of resin and pigment, and then multiplying by 100.

The following Examples are being supplied to further define various species of the present invention, it being noted that these Examples are intended to illustrate and not limit the scope of the present invention. Parts and percentages are by weight unless otherwise indicated.

EXAMPLE I

Poly(1,2-propylene terephthalate-co-diethylene terephthalate) end blocked with stearate with an average molecular weight of 10,500 grams per mole and having a diethylene/1,2-propylene molar ratio of 15:85, respectively, and end blocked with a stearate group was prepared as follows.

A 7.6 liter Parr reactor equipped with a bottom drain valve, double turbine agitator and distillation receiver with a cold water condenser was charged with 3,250 grams of dimethylterephthalate, 2,369 grams of 1,2-propanediol, 267.91 grams of diethylene glycol, 51 grams of stearic acid, and 4.7 grams of butyltin oxide catalyst obtained as FASCAT 4100™ from Elf Atochem North America, Inc. The reactor was then heated to 165° C. with stirring at 150 revolutions per minute and then heated to 200° C. over a duration of 6 hours, wherein the methanol byproduct (890 grams) was collected via the distillation receiver to a container, and was comprised of about 98 percent by volume of methanol and 2 percent by volume of 1,2-propanediol as measured by the ABBE refractometer available from American Optical Corporation. The mixture was then maintained at 200° C., and the pressure was reduced from atmospheric to about 0.2 torr over a duration of about 3 hours. During this time, there were further collected approximately 1,172 grams of glycol with about 97 percent by volume of 1,2-propanediol and 3 percent by volume of methanol as measured by the ABBE refractometer. (The theoretical yield of methanol is 1,072 grams, and usually the transesterification is accomplished until about 980 to 1,000 grams of methanol, 93 percent conversion). The reactor was then purged with nitrogen to atmospheric pressure, and the polymer discharged through the bottom drain onto a container cooled with dry ice to yield 3.65 kilograms of poly(1,2-propylene terephthalate-co-diethylene terephthalate) end blocked with stearate resin. The aforementioned resin product glass transition temperature was measured to be 57° C. (onset) utilizing the 910 Differential Scanning Calorimeter available from E.I. DuPont operating at a heating rate of 10° C. per minute. The number average molecular weight of the polyester product resin was measured to be 6,000 grams per mole and the weight average molecular weight was measured to be 10,500 grams per mole using tetrahydrofuran as the solvent and obtained with the 700 Satellite WISP gel permeation chromatograph available from Waters Company equipped with a styrogel column. 1.8 Grams of the poly(1, 2-propylene terephthalate-co-diethylene terephthalate) end blocked with stearate resin were then pressed into a pellet of about 1 centimeter in diameter and about 10 centimeters in length using a press and die set supplied by Shimadzu with the Flowtester 500 series. The pressed sample pellet was then loaded in the flowtester and subjected to standard Shimadzu conditions using 20 kilograms/cm2 load, and barrel temperature heated from 20° C. to 130° C. at a rate of 10° C. per minute. For the polyester resin of this Example, a softening point of 78° C., beginning of flow temperature T1 of 90° C., and flow temperature T2 of 104° C. were obtained. The melt index of the resin of this Example was found to be 9.3 grams per 10 minutes at 117° C. with a loading of 2.16 kilograms. The acid number of the polyester resin was found to be less than 1 milliequivalent per gram of potassium hydroxide.

EXAMPLE II

Poly(1,2-propylene terephthalate-co-diethylene terephthalate) end blocked with stearate with an average molecular weight of 15,600 grams per mole and having a diethylene/1,2-propylene molar ratio of 15:85, respectively, and end blocked with a stearate group was prepared as follows.

A 7.6 liter Parr reactor equipped with a bottom drain valve, double turbine agitator and distillation receiver with a cold water condenser was charged with 3,250 grams of dimethylterephthalate, 2,369 grams of 1,2-propanediol (1 equivalent excess), 267.91 grams of diethylene glycol, 51 grams of stearic acid, and 4.7 grams of butyltin oxide catalyst obtained as FASCAT 4100™ from Elf Atochem North America, Inc. The reactor was then heated to 165° C. with stirring at 150 revolutions per minute and then heated to 200° C. over a duration of 6 hours, wherein the methanol byproduct (805 grams) was collected via the distillation receiver to a container comprised of about 98 percent by volume of methanol and 2 percent by volume of 1,2-propanediol as measured by the ABBE refractometer available from American Optical Corporation. The mixture was then maintained at 200° C., and the pressure was reduced from atmospheric to about 0.2 torr over a duration of about 3 hours. During this time, there was further collected approximately 1,237 grams of glycol with about 97 percent by volume of 1,2-propanediol and 3 percent by volume of methanol as measured by the ABBE refractometer. The reactor was then purged with nitrogen to atmospheric pressure, and the polymer discharged through the bottom drain onto a container cooled with dry ice to yield 3.65 kilograms of poly(1,2-propylene terephthalate-co-diethylene terephthalate) end blocked with stearate resin. The resin glass transition temperature was measured to be 61° C. (onset) utilizing the 910 Differential Scanning Calorimeter available from DuPont operating at a heating rate of 10° C. per minute. The number average molecular weight was measured to be 7,700 grams per mole and the weight average molecular weight was measured to be 15,600 grams per mole using tetrahydrofuran as the solvent and obtained with the 700 Satellite WISP gel permeation chromatograph available from Waters Company equipped with a styrogel column. The melt index of the resin of this Example was found to be 2.0 grams per 10 minutes at 117° C. with a loading of 2.16 kilograms. The acid number of the polyester resin was found to be less than 1 milliequivalent per gram of potassium hydroxide.

EXAMPLE III

Poly(1,2-propylene terephthalate-co-diethylene terephthalate-co-1,1,1-trimethylene propane terephthalate) end blocked with stearate with an average molecular weight of 41,700 grams per mole and having a diethylene/1,2-propylene molar ratio of 25:75, respectively, trimethylolpropane as branching agent and end blocked with a stearate group was prepared as follows.

A 7.6 liter Parr reactor equipped with a bottom drain valve, double turbine agitator and distillation receiver with a cold water condenser was charged with 3,250 grams of dimethylterephthalate, 2,228.8 grams of 1,2-propanediol (1 equivalent excess), 443.1 grams of diethylene glycol, 47.5 grams of stearic acid, 44.8 grams of trimethylol propane and 4.7 grams of butyltin oxide catalyst obtained as FASCAT 4100™ from Elf Atochem North America, Inc. The reactor was then heated to 165° C. with stirring at 150 revolutions per minute and then heated to 200° C. over a duration of 6 hours, wherein the methanol byproduct (800 grams) was collected via the distillation receiver to a container comprised of about 98 percent by volume of methanol and 2 percent by volume of 1,2-propanediol as measured by the ABBE refractometer available from American Optical Corporation. The mixture was then maintained at 200° C., and the pressure was reduced from atmospheric to about 0.2 torr over a duration of about 3 hours. During this time, there were further collected approximately 1,300 grams of distillate in the distillation receiver comprised of approximately 97 percent by volume of 1,2-propanediol and 3 percent by volume of methanol as measured by the ABBE refractometer. The pressure was then further maintained at about 0.2 torr, and the temperature of the reaction mixture increased to 210° C. for an additional 2 hours, wherein an additional 27 grams of 1,2-propanediol were collected. The reactor was then purged with nitrogen to atmospheric pressure, and the polymer discharged through the bottom drain onto a container cooled with dry ice to yield 3.7 kilograms of poly(1, 2-propylene terephthalate-co-diethylene terephthalate-co-1, 1,1-trimethylene propane terephthalate) end blocked with stearate resin. The resin glass transition temperature was measured to be 58° C. (onset) utilizing the 910 Differential Scanning Calorimeter available from E.I. DuPont operating at a heating rate of 10° C. per minute. The number average molecular weight was measured to be 10,900 grams per mole and the weight average molecular weight was measured to be 41,700 grams per mole using tetrahydrofuran as the solvent and obtained with the 700 Satellite WISP gel permeation chromatograph available from Waters Company equipped with a styrogel column. 1.8 Grams of the poly(1, 2-propylene terephthalate-co-diethylene terephthalate-co-1, 1,1-trimethylene propane terephthalate) end blocked with stearate resin were then pressed into a pellet of about 1 centimeter in diameter and about 10 centimeters in length using a press and die set supplied by Shimadzu with the Flowtester 500 series. The pressed sample pellet was then loaded in the flowtester and subjected to standard Shimadzu conditions using 20 kilograms/cm2 load, and barrel temperature heated from 20° C. to 130° C. at a rate of 10° C. per minute. For the resin of this Example, a softening point of 80° C., beginning of flow temperature T1 of 97° C., and flow temperature T2 of 105° C. were obtained. The melt index of the resin of this Example was found to be 10.1 grams per 10 minutes at 117° C. with a loading of 16.6 kilograms. The acid number of the polyester resin was found to be less than 1 milliequivalent per gram of potassium hydroxide.

EXAMPLE IV

Poly(1,2-propylene terephthalate-co-diethylene terephthalate-co-1,1,1-trimethylene propane terephthalate)

end blocked with stearate with an average molecular weight of 38,300 grams per mole and having a diethylene/1,2-propylene molar ratio of 25:75, respectively, trimethylolpropane as branching agent and terminated with a stearyl end group was prepared as follows.

A 7.6 liter Parr reactor equipped with a bottom drain valve, double turbine agitator and distillation receiver with a cold water condenser was charged with 3,250 grams of dimethylterephthalate, 2,228.8 grams of 1,2-propanediol (1 equivalent excess), 443.1 grams of diethylene glycol, 47.5 grams of stearic acid, 44.8 grams of trimethylol propane and 4.7 grams of butyltin oxide catalyst obtained as FASCAT 4100™ from Elf Atochem North America, Inc. The reactor was then heated to 165° C. with stirring at 150 revolutions per minute and then heated to 200° C. over a duration of 6 hours, wherein the methanol byproduct (809 grams) was collected via the distillation receiver to a container comprised of about 98 percent by volume of methanol and 2 percent by volume of 1,2-propanediol as measured by the ABBE refractometer available from American Optical Corporation. The mixture was then maintained at 200° C., and the pressure was reduced from atmospheric to about 0.2 torr over a duration of about 3 hours. During this time, there were further collected approximately 1,350 grams of distillate in the distillation receiver comprised of approximately 97 percent by volume of 1,2-propanediol and 3 percent by volume of methanol as measured by the ABBE refractometer. The pressure was then further maintained at about 0.2 torr and the temperature of the reaction mixture increased to 210° C. for an additional 2 hours, wherein an additional 27 grams of 1,2-propanediol were collected. The reactor was then purged with nitrogen to atmospheric pressure, and the polymer discharged through the bottom drain onto a container cooled with dry ice to yield 3.7 kilograms of poly(1, 2-propylene terephthalate-co-diethylene terephthalate-co-1, 1,1-trimethylene propane terephthalate) end blocked with stearate resin. The resin glass transition temperature was measured to be 57.5° C. (onset) utilizing the 910 Differential Scanning Calorimeter available from DuPont operating at a heating rate of 10° C. per minute. The number average molecular weight was measured to be 10,000 grams per mole and the weight average molecular weight was measured to be 38,300 grams per mole using tetrahydrofuran as the solvent and obtained with the 700 Satellite WISP gel permeation chromatograph available from Waters Company equipped with a styrogel column. 1.8 Grams of the poly(1, 2-propylene terephthalate-co-diethylene terephthalate-co-1, 1,1-trimethylene propane terephthalate) end blocked with stearate resin were then pressed into a pellet of about 1 centimeter in diameter and about 10 centimeters in length using a press and die set supplied by Shimadzu with the Flowtester 500 series. The melt index of the resin of this Example was found to be 20.3 grams per 10 minute at 117° C. with a loading of 16.6 kilograms. The acid number of the polyester resin was found to be less than 1 milliequivalent per gram of potassium hydroxide.

COMPARATIVE EXAMPLE V

Poly(1,2-propylene terephthalate-co-diethylene terephthalate-co-1,1,1-trimethylene propane terephthalate) resin with an average molecular weight of 34,000 grams per mole and having a diethylene/1,2-propylene molar ratio of 25:75, respectively, and note that with no hydrophobic end groups are present, was prepared as follows.

A 7.6 liter Parr reactor equipped with a bottom drain valve, double turbine agitator and distillation receiver with a cold water condenser was charged with 3,250 grams of dimethylterephthalate, 2,228.8 grams of 1,2-propanediol (1 equivalent excess), 443.1 grams of diethylene glycol, 44.8 grams of trimethylol propane and 4.7 grams of butyltin oxide catalyst obtained as FASCAT 4100™ from Elf Atochem North America, Inc. The reactor was then heated to 165° C. with stirring at 150 revolutions per minute and then heated to 200° C. over a duration of 6 hours, wherein the methanol byproduct (809 grams) was collected via the distillation receiver to a container comprised of about 98 percent by volume of methanol and 2 percent by volume of 1,2-propanediol as measured by the ABBE refractometer available from American Optical Corporation. The mixture was then maintained at 200° C., and the pressure was reduced from atmospheric to about 0.2 torr over a duration of about 3 hours. During this time, there were further collected approximately 1,240 grams of distillate in the distillation receiver comprised of approximately 97 percent by volume of 1,2-propanediol and 3 percent by volume of methanol as measured by the ABBE refractometer. The pressure was then further maintained at about 0.2 torr and the temperature of the reaction mixture increased to 210° C. for an additional 2 hours, wherein an additional 30 grams of 1,2-propanediol were collected. The reactor was then purged with nitrogen to atmospheric pressure, and the polymer discharged through the bottom drain onto a container cooled with dry ice to yield 3.7 kilograms of poly(1,2-propylene terephthalate-co-diethylene terephthalate-co-1,1,1-trimethylene propane terephthalate) resin. The resin glass transition temperature was measured to be 57.2° C. (onset) utilizing the 910 Differential Scanning Calorimeter available from DuPont operating at a heating rate of 10° C. per minute. The number average molecular weight was measured to be 10,100 grams per mole and the weight average molecular weight was measured to be 34,000 grams per mole using tetrahydrofuran as the solvent and obtained with the 700 Satellite WISP gel permeation chromatograph available from Waters Company equipped with a styrogel column. 1.8 Grams of the poly(1,2-propylene terephthalate-co-diethylene terephthalate-co-1,1,1-trimethylene propane terephthalate) resin were then pressed into a pellet of about 1 centimeter in diameter and about 10 centimeters in length using a press and die set supplied by Shimadzu with the Flowtester 500 series. The melt index of the resin of this Example was found to be 17 grams per 10 minute at 117° C. with a loading of 16.6 kilograms. The acid number of the polyester resin was found to be 16 milliequivalent per gram of potassium hydroxide.

EXAMPLE VI

A toner composition comprised of 95 percent by weight of the polyester resin of Example II and 5 percent by weight of REGAL 330® pigment was prepared as follows.

The polyester resin of Example II was ground to about 500 microns average volume diameter in a Model J Fitzmill equipped with an 850 micrometer screen. After grinding, 950 grams (95 percent by weight of toner) of the polyester polymer were mixed with 50 grams of REGAL 330® carbon black pigment (5 percent by weight of toner). The two components were dry blended first on a paint shaker and then on a roll mill. A Davo twin screw extruder was then used to melt mix the aforementioned mixture at a barrel temperature of 140° C., screw rotational speed of 50 rpm and at a feed rate of 20 grams per minute. The extruded strands were broken into coarse particles utilizing a coffee bean grinder available from Black and Decker. An 8 inch Sturtevant micronizer was used to reduce the particle size further. After grinding, the toner was measured to display an average volume diameter particle size of 9.1 microns with a geometric distribution of 1.43 as measured by the Coulter Counter. The resulting toner was then utilized without further classification.

A developer composition was prepared by roll milling the aforementioned toner, 3 parts by weight, with 100 parts by weight of a 90 micron diameter ferrite carrier core with a coating, 0.55 percent by weight of a polymer of methylmethacrylate (80.4 percent), vinyl triethoxysilane (5 percent) and styrene (14.1 percent). The tribo data was obtained using the known blow-off Faraday Cage apparatus. Toner developer was subjected to 80 percent humidity in a chamber for 48 hours at 80° F. to result in a triboelectric charge of −15 microcoulombs per gram, and at 20 percent humidity level in a chamber for 48 hours at 60° F. to result in a triboelectric charge of −33 microcoulombs per gram. The ratio of the corresponding triboelectric charge at 20 percent RH to 80 percent RH as given by Equation 1 was measured to be 2.2. Unfused copies were then produced using a custom made imaging apparatus similar to the Xerox Corporation 9200 imaging apparatus with the fusing system disabled. The unfused copies were then fused in the 1075 fuser. Fusing evaluation of the toner indicated a minimum fixing temperature of about 129° C., and hot-offset temperature of 170° C.

EXAMPLE VII

A toner composition comprised of 91 percent by weight of the polyester resin of Example III, 5 percent by weight of REGAL 330® pigment, and 4 percent by weight of 660P wax available from SANYO KASEI K. K. was prepared as follows.

The polyester resin of Example III was ground to about 500 microns average volume diameter in a Model J Fitzmill equipped with an 850 micrometer screen. After grinding, 910 grams of polymer were mixed with 50 grams of REGAL 330® pigment and 40 grams of 660P polypropylene wax. The three components were dry blended first on a paint shaker and then on a roll mill. A Davo twin screw extruder was then used to melt mix the aforementioned mixture at a barrel temperature of 140° C., screw rotational speed of 50 rpm and at a feed rate of 20 grams per minute. The extruded strands were broken into coarse particles utilizing a coffee bean grinder available from Black and Decker. An 8 inch Sturtevant micronizer was used to reduce the particle size further. After grinding, the toner was measured to display an average volume diameter particle size of 8.5 microns with a geometric distribution of 1.43 as measured by the Coulter Counter. The resulting toner was then utilized without further classification. A developer composition was prepared by roll milling the aforementioned toner, 3 parts by weight with 100 parts by weight of the carrier of Example VI. The tribo data was obtained using the known blow-off Faraday Cage apparatus, and the toner developer was subjected to 20 percent humidity in a chamber for 48 hours at 60° F. to result in a triboelectric charge of −37 microcoulombs per gram, and at 80 percent humidity level in a chamber for 48 hours at 80° F. to result in a triboelectric charge of −17 microcoulombs per gram. The ratio of the corresponding triboelectric charge at 20 percent RH to 80 percent RH as given by Equation 1 was measured to be 2.18. Unfused copies were then produced with the imaging apparatus of Example VI with the fusing system disabled. The unfused copies were then fused with a Xerox Corporation 1075 fuser. Fusing evaluation of the toner indicated a minimum fixing temperature of about 133° C., and hot-offset temperature of 165° C.

EXAMPLE VIII

A toner composition comprised of 95 percent by weight of the polyester resin of Example IV and 5 percent by weight of REGAL 330® pigment was prepared as follows.

The polyester resin of Example IV was ground to about 500 microns average volume diameter in a Model J Fitzmill equipped with an 850 micrometer screen. After grinding, 950 grams (95 percent by weight of toner) of polymer were mixed with 50 grams of REGAL 330® pigment (5 percent by weight of toner). The two components were dry blended first on a paint shaker and then on a roll mill. A Davo twin screw extruder was then used to melt mix the aforementioned mixture at a barrel temperature of 140° C., screw rotational speed of 50 rpm and at a feed rate of 20 grams per minute. The extruded strands were broken into coarse particles utilizing a coffee bean grinder available from Black and Decker. An 8 inch Sturtevant micronizer was used to reduce the particle size further. After grinding, the toner was measured to display an average volume diameter particle size of 8.5 microns with a geometric distribution of 1.45 as measured by the Coulter Counter. The resulting toner was then utilized without further classification. A developer composition was prepared by roll milling the aforementioned toner, 3 parts by weight with 100 parts by weight of the carrier of Example VI. The tribo data was obtained using the known blow-off Faraday Cage apparatus, and the toner developer was subjected to 20 percent humidity in a chamber for 48 hours at 60° F. to result in a triboelectric charge of −30 microcoulombs per gram, and at 80 percent humidity level in a chamber for 48 hours at 80° F. to result in a triboelectric charge of −15 microcoulombs per gram. The ratio of the corresponding triboelectric charge at 20 percent RH to 80 percent RH as given by Equation 1 was measured to be 2.0. Unfused copies were then produced with the imaging apparatus of Example VI with the fusing system disabled. The unfused copies were subsequently fused in a Xerox Corporation 1075 fuser. Fusing evaluation of the toner indicated a minimum fixing temperature of about 129° C., and hot-offset temperature of 165° C.

COMPARATIVE EXAMPLE IX

A toner composition comprised of 91 percent by weight of the polyester resin of Comparative Example V, 5 percent by weight of REGAL 330® pigment, and 4 percent by weight of 660P polypropylene wax was prepared as follows.

The polyester resin of Example V was in the form of a large chunk. The resulting polymer was ground to about 500 microns average volume diameter in a Model J Fitzmill equipped with an 850 micrometer screen. After grinding, 910 grams of polymer were mixed with 50 grams of REGAL 330® pigment and 40 grams of 660P wax. The three components were dry blended first on a paint shaker and then on a roll mill. A Davo twin screw extruder was then used to melt mix the aforementioned mixture at a barrel temperature of 140° C., screw rotational speed of 50 rpm and at a feed rate of 20 grams per minute. The extruded strands were broken into coarse particles utilizing a coffee bean grinder available from Black and Decker. An 8 inch Sturtevant micronizer was used to reduce the particle size further. After grinding, the toner was measured to display an average volume diameter particle size of 7.9 microns with a geometric distribution of 1.39 as measured by the Coulter Counter. The resulting toner was then utilized without further classification. A developer composition was prepared by roll milling the aforementioned toner, 3 parts by weight with 100 parts by weight of the carrier of Example VI. The tribo data was obtained using the known blow-off Faraday Cage apparatus, and the toner developer was subjected to 20 percent humidity in a chamber for 48 hours at 60° F. to result in toner triboelectric charge of −60 microcoulombs per gram, and at 80 percent humidity level in a chamber for 48 hours at 80° F. to result in toner triboelectric charge of −15 microcoulombs per gram. The ratio of the corresponding triboelectric charge at 20 percent RH to 80 percent RH as given by Equation 1 was measured to be 4.0. In comparison to the toner compositions of Examples VI, VII, and VIII, the RH sensitivity of this Example was much higher because no hydrophobic end group was present. Unfused copies were then produced with the imaging apparatus with the fusing system disabled. The unfused copies were then subsequently fused with the Xerox Corporation 1075 fuser. Fusing evaluation of the toner indicated a minimum fixing temperature of about 135° C., and hot-offset temperature of 170° C.

EXAMPLE X

A toner composition comprised of 98 percent by weight of the polyester resin of Example I and 2 percent by weight of PV FAST BLUE™ pigment was prepared as follows.

The polyester resin of Example I was to about 500 microns average volume diameter in a Model J Fitzmill equipped with an 850 micrometer screen. After grinding, 980 grams (98 percent by weight of toner) of polymer were mixed with 20 grams of PV FAST BLUE™ pigment (2 percent by weight of toner). The two components were dry blended first on a paint shaker and then on a roll mill. A Davo twin screw extruder was then used to melt mix the aforementioned mixture at a barrel temperature of 120° C., screw rotational speed of 50 rpm, and at a feed rate of 25 grams per minute. The extruded strands were broken into coarse particles utilizing a coffee bean grinder available from Black and Decker. An 8 inch Sturtevant micronizer was used to reduce the particle size further. After grinding, the toner was measured to display an average volume diameter particle size of 6.9 microns with a geometric distribution of 1.37 as measured by the Coulter Counter. The resulting toner was then utilized without further classification. A developer composition was prepared by roll milling the aforementioned toner, 3 parts by weight, with 100 parts by weight of the carrier of Example VI. The tribo data was obtained using the known blow-off Faraday Cage apparatus, and the toner developer was subjected to 20 percent humidity in a chamber for 48 hours at 60° F. to result in a triboelectric charge of 16 microcoulombs per gram, and at 80 percent humidity level in a chamber for 48 hours at 80° F. to result in a triboelectric charge of 8 microcoulombs per gram. The ratio of the corresponding triboelectric charge at 20 percent RH to 80 percent RH as given by Equation 1 was measured to be 2.0. Unfused copies were then produced with the imaging apparatus of Example VI with the fusing system disabled. The unfused copies were then subsequently fused with the Xerox Corporation MAJESTIK™ color fuser. Fusing evaluation of the toner indicated a minimum fixing temperature of about 135° C., and hot-offset temperature of 170° C.

Other embodiments and modifications of the present invention may occur to those of skill in this art subsequent to a review of the present application and the information presented herein; these embodiments and modifications, as well as equivalents thereof, are also included within the scope of this invention.

What is claimed is:

1. A toner composition comprised of a polyester resin with hydrophobic end groups, pigment, optional wax, optional charge additive, and optional surface additives, and wherein the polyester resin containing hydrophobic end groups is derived from at least one organic diol monomer, at least one organic diacid or diester monomer, at least one hydrophobic monofunctional alcohol or monofunctional acid monomer, and optionally one or more tri or multifunctional branching monomers, and wherein said polyester is of the following alternative formulas

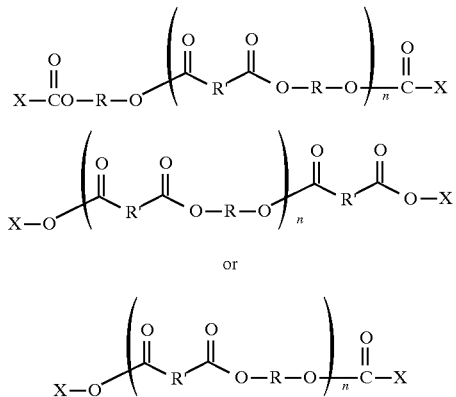

wherein R is a divalent alkylene group, a cyclohexylene, a 1,4-dimethyl cyclohexylene group or mixtures thereof; R' is a divalent arylene group with from about 6 to about 14 carbon atoms, an olefinic group, a divalent alkylene group or mixtures thereof; X is an alkyl or aryl group; and n represents the number of segments.

2. A toner composition in accordance with claim 1 wherein said divalent alkylene moiety R is a hydrocarbon with from about 2 to about 22 carbon atoms; R' is phenylene, isophthalylene, terephthalylene phthalylene, vinylene, methylvinylene, the divalent alkylene group methylene, ethylene, propylene, butylene, pentylene, or hexylene; and n is a number of from about 10 to about 300.

3. A toner composition in accordance with claim 1 wherein R' alkylene is methylene, propylene, ethylene, butylene, pentylene, hexylene, or heptylene, and X is hexyl, heptyl, octyl, lauryl, stearyl, naphthylenemethyl, 1-naphthaleneethyl, benzyl, phenyl or naphthyl.

4. A toner composition comprised of a polyester resin with hydrophobic end groups, pigment, optional wax, optional charge additive, and optional surface additives, and wherein the polyester resin containing hydrophobic end groups is derived from at least one organic diol monomer, at least one organic diacid or diester monomer, at least one hydrophobic monofunctional alcohol or monofunctional acid monomer, and optionally one or more tri or multifunctional branching monomer, wherein the polyester resin with hydrophobic end groups is of the following alternative formulas

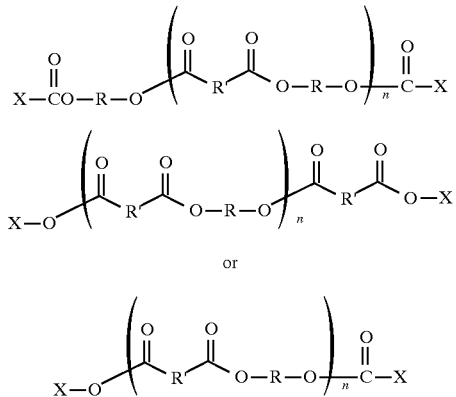

wherein R is a divalent alkylene group, a cyclohexylene, a 1,4-dimethyl cyclohexylene group or mixtures thereof; R' is a divalent arylene group with from about 6 to about 14 carbon atoms, an olefinic group, a divalent alkylene group or mixtures thereof; X is an alkyl or aryl group; and n represents the number of segments, and wherein the polyester resin with hydrophobic alkyl end groups is further comprised of an additional branching segment, p or q, as illustrated by the following alternative formulas

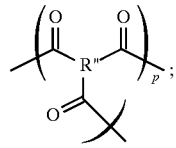

or

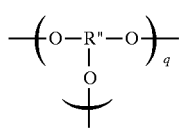

wherein R" is a trivalent aromatic or aliphatic radical with from about 3 to about 20 carbon atoms, including the trivalent derivatives of propane, butane, pentane, hexane, cyclohexane, heptane, octane, benzene, naphthalene, anthracene; and p and q represent the branching segment used to prepare the resin.

5. A toner composition comprised of a polyester resin with hydrophobic end groups, pigment, optional wax, optional charge additive, and optional surface additives, and wherein the polyester resin containing hydrophobic end groups is derived from at least one organic diol monomer, at least one organic diacid or diester monomer, at least one hydrophobic monofunctional alcohol or monofunctional acid monomer, and optionally one or more tri or multifunctional branching monomer, wherein the polyester resin with hydrophobic end groups is of the following alternative formulas

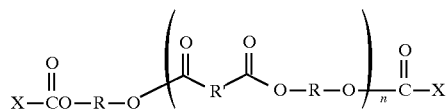

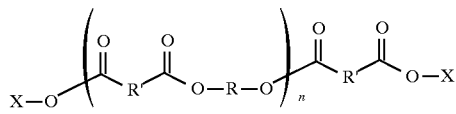

or

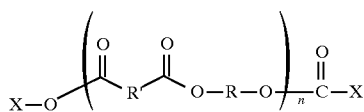

wherein R is a divalent alkylene group, a cyclohexylene, a 1,4-dimethyl cyclohexylene group or mixtures thereof; R' is a divalent arylene group with from about 6 to about 14 carbon atoms, an olefinic group, a divalent alkylene group or mixtures thereof; X is an alkyl or aryl group; and n represents the number of segments, wherein the polyester resin with hydrophobic end groups is further comprised of an additional branching segment, r or s, as illustrated by the following alternative formulas

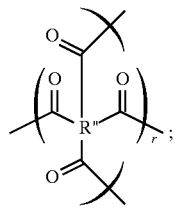

or

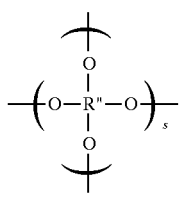

wherein R" is multifunctional radical including a polyvalent or tetravalent aromatic or aliphatic radical with from about 3 to about 20 carbon atoms; and r and s represent the branching segment.

6. A toner composition comprised of a polyester resin containing hydrophobic end groups, colorant, wax, optional charge additive, and surface additives, and wherein the polyester resin with hydrophobic end groups is poly(1,2-propylene terephthalate-co-diethylene terephthalate) end blocked with stearyl or stearate, poly(1,2-propylene terephthalate-co-diethylene terephthalate-co-1,1,1-trimethylene propane terephthalate) end blocked with stearyl or stearate, poly(1,2-propylene terephthalate) end blocked with stearyl or stearate, poly(1,2-propylene terephthalate-co-diethylene terephthalate) end blocked with lauryl or laurate, poly(1,2-propylene terephthalate-co-diethylene terephthalate) end blocked with cetyl or palmitate, poly(1,2-propylene terephthalate-co-diethylene terephthalate) end blocked with octoate, poly(1,2propyleneterephthalate-co-diethylene terephthalate) end blocked with stearyl, lauryl, palmitate, stearate, or laurate; and mixtures thereof.

7. A toner consisting essentially of a polyester resin containing hydrophobic end groups, colorant, wax, optional charge additive, and surface additives, and wherein said polyester is poly(1,2-propylene terephthalate-co-diethylene terephthalate) end blocked with stearate.

8. A toner consisting essentially of a polyester resin containing hydrophobic end groups, colorant, wax, optional charge additive, and optional surface additives, and wherein said polyester is poly(1,2-propylene terephthalate-co-diethylene terephthalate-co-1,1,1-trimethylene propane terephthalate) end blocked with stearate.

* * * * *